US012626621B2

(12) United States Patent
Han

(10) Patent No.: US 12,626,621 B2
(45) Date of Patent: May 12, 2026

(54) METHOD AND APPARATUS FOR ADJUSTING SCREEN BRIGHTNESS OF HEAD-MOUNTED DISPLAY DEVICE, AND HEAD-MOUNTED DISPLAY DEVICE

(71) Applicant: Goertek Inc., Weifang (CN)

(72) Inventor: Wenqiang Han, Shandong (CN)

(73) Assignee: Goertek Inc., Weifang (CN)

( * ) Notice: Subject to any disclaimer, the term of this patent is extended or adjusted under 35 U.S.C. 154(b) by 0 days.

(21) Appl. No.: 18/714,713

(22) PCT Filed: Aug. 26, 2022

(86) PCT No.: PCT/CN2022/115059
§ 371 (c)(1),
(2) Date: May 30, 2024

(87) PCT Pub. No.: WO2023/098175
PCT Pub. Date: Jun. 8, 2023

(65) Prior Publication Data
US 2025/0029525 A1 Jan. 23, 2025

(30) Foreign Application Priority Data

Nov. 30, 2021 (CN) .......................... 202111450347.2

(51) Int. Cl.
*G09G 3/00* (2006.01)
*G06F 3/01* (2006.01)
*G02B 27/01* (2006.01)

(52) U.S. Cl.
CPC .............. *G09G 3/001* (2013.01); *G06F 3/013* (2013.01); *G02B 27/0172* (2013.01); *G02B*

*27/0179* (2013.01); *G09G 2320/0626* (2013.01); *G09G 2354/00* (2013.01); *G09G 2360/144* (2013.01)

(58) Field of Classification Search
CPC .. G06F 3/01; G06F 3/013; G09G 5/02; G09G 5/10; G06T 7/62
See application file for complete search history.

(56) References Cited

U.S. PATENT DOCUMENTS

| | | | | |
|---|---|---|---|---|
| 2018/0286070 A1* | 10/2018 | Benedetto | ................. | G06T 7/62 |
| 2018/0365875 A1* | 12/2018 | Yildiz | .................... | G06V 40/19 |
| 2019/0265785 A1* | 8/2019 | Ho | .......................... | G06F 3/013 |

FOREIGN PATENT DOCUMENTS

| | | | |
|---|---|---|---|
| CN | 103091843 A | 5/2013 |
| CN | 105070272 A | 11/2015 |
| CN | 105262900 A | 1/2016 |
| CN | 105630167 A | 6/2016 |
| CN | 108989570 A | 12/2018 |
| CN | 109633907 A | 4/2019 |
| CN | 110275613 A | 9/2019 |
| CN | 110890078 A | 3/2020 |

* cited by examiner

*Primary Examiner* — Michael A Faragalla
(74) *Attorney, Agent, or Firm* — Baker Botts LLP

(57) ABSTRACT

The present disclosure provides a method and an apparatus for adjusting screen brightness of a head-mounted display device, and the head-mounted display device. The method includes: acquiring current pupil information of a wearer of the head-mounted display device and current ambient brightness information; determining a target screen brightness value based on the current ambient brightness information and the current pupil information; and adjusting the screen brightness according to the target screen brightness value.

10 Claims, 6 Drawing Sheets

S5100

Acquire current pupil information of a wearer of the head-mounted display device and current ambient brightness information

S5200

Determine a target screen brightness value based on the current ambient brightness information and the current pupil information

S5300

Adjust the screen brightness according to the target screen brightness value

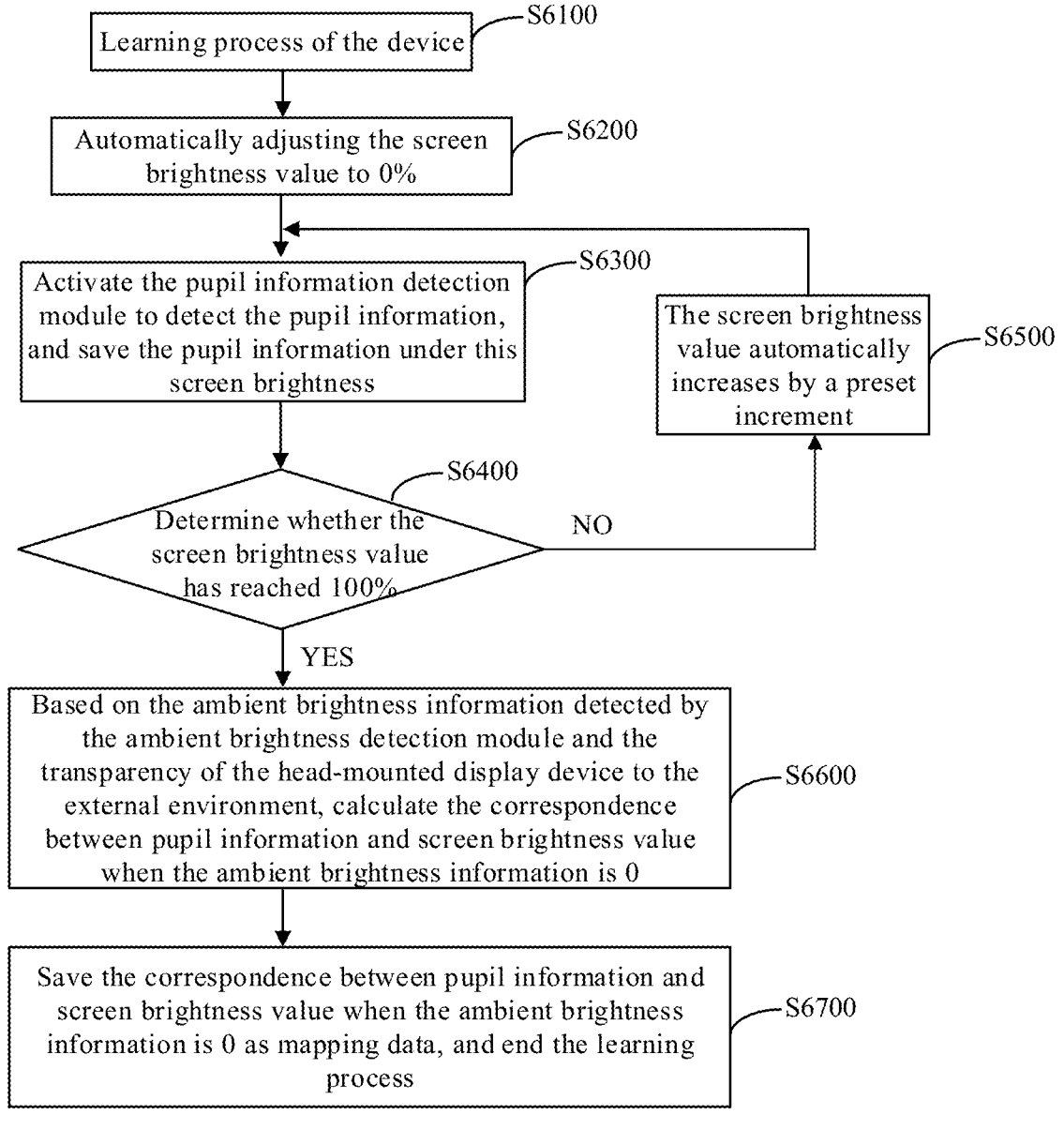

Learning process of the device — S6100

Automatically adjusting the screen brightness value to 0% — S6200

Activate the pupil information detection module to detect the pupil information, and save the pupil information under this screen brightness — S6300

Determine whether the screen brightness value has reached 100% — S6400

The screen brightness value automatically increases by a preset increment — S6500

NO

YES

Based on the ambient brightness information detected by the ambient brightness detection module and the transparency of the head-mounted display device to the external environment, calculate the correspondence between pupil information and screen brightness value when the ambient brightness information is 0 — S6600

Save the correspondence between pupil information and screen brightness value when the ambient brightness information is 0 as mapping data, and end the learning process — S6700

METHOD AND APPARATUS FOR ADJUSTING SCREEN BRIGHTNESS OF HEAD-MOUNTED DISPLAY DEVICE, AND HEAD-MOUNTED DISPLAY DEVICE

CROSS-REFERENCE TO RELATED APPLICATIONS

This application is a National Stage of International Application No. PCT/CN2022/115059, filed on Aug. 26, 2022, which claims priority to Chinese Patent Application No. 202111450347.2, filed on Nov. 30, 2021, both of which are hereby incorporated by reference in their entireties.

TECHNICAL FIELD

Embodiments of the present disclosure relate to the technical field of VR (virtual reality) display, and specifically to a method for adjusting screen brightness of a head-mounted display device, an apparatus for adjusting screen brightness of a head-mounted display device, and a head-mounted display device.

BACKGROUND

A Virtual Reality (VR) head-mounted display device utilizes a head-mounted display device to isolate users from the external visual and auditory environment, guiding users to feel as if they are in a virtual environment. Current VR head-mounted display devices have two methods for adjusting screen brightness: one is manual adjustment based on the user's actual experience, which is to adjust according to the human eye's actual perception to achieve the most comfortable effect for the human eye, and is cumbersome in operation. The other method is automatic screen brightness adjustment based on ambient brightness information, but this adjustment is programmatically fixed and cannot perform adjustment according to the user's actual perception.

SUMMARY

One objective of an embodiment of the present disclosure is to provide a new technical solution for adjusting screen brightness of a head-mounted display device.

According to a first aspect of an embodiment of the present disclosure, a method for adjusting screen brightness of a head-mounted display device is provided, the method comprising:

acquiring current pupil information of a wearer of the head-mounted display device and current ambient brightness information;

determining a target screen brightness value based on the current ambient brightness information and the current pupil information; and adjusting the screen brightness according to the target screen brightness value.

Optionally, the "determining a target screen brightness value based on the current ambient brightness information and the current pupil information" includes:

acquiring preset mapping data when the current ambient brightness information meets a preset ambient brightness threshold, wherein the mapping data reflects a correspondence between the wearer's pupil information and screen brightness values; and determining a target screen brightness value corresponding to the current pupil information based on the mapping data.

Optionally, before "acquiring current pupil information of a wearer of the head-mounted display device and current ambient brightness information", the method further comprises a step of "obtaining the mapping data", which includes:

acquiring a first preset screen brightness value and corresponding pupil information of the wearer when the wearer first wears the head-mounted display device;

adjusting the first preset screen brightness value based on a preset increment to obtain a plurality of intermediate screen brightness values, and acquiring pupil information corresponding to each intermediate screen brightness value; and when the intermediate screen brightness value reaches a second preset screen brightness value, obtaining the mapping data based on the first preset screen brightness value and its corresponding pupil information of the wearer, and each intermediate screen brightness value and its corresponding pupil information of the wearer.

Optionally, the first preset screen brightness value is 0%, and the second preset screen brightness value is 100%.

According to a second aspect of an embodiment of the present disclosure, an apparatus for adjusting screen brightness of a head-mounted display device is provided, the apparatus comprising:

an acquisition module for acquiring current pupil information of a wearer of the head-mounted display device and current ambient brightness information;

a determination module for determining a target screen brightness value based on the current ambient brightness information and the current pupil information; and an adjustment module for adjusting the screen brightness according to the target screen brightness value.

Optionally, the determination module is specifically configured to:

acquiring preset mapping data when the current ambient brightness information meets a preset ambient brightness threshold, wherein the mapping data reflects a correspondence between the wearer's pupil information and screen brightness values; and determining a target screen brightness value corresponding to the current pupil information based on the mapping data.

Optionally, before the acquisition module acquires current pupil information of a wearer of the head-mounted display device and current ambient brightness information, the acquisition module is also configured to "obtain the mapping data", which includes:

acquiring a first preset screen brightness value and corresponding pupil information of the wearer when the wearer first wears the head-mounted display device;

adjusting the first preset screen brightness value based on a preset increment to obtain a plurality of intermediate screen brightness values, and acquiring pupil information corresponding to each intermediate screen brightness value; and when the intermediate screen brightness value reaches a second preset screen brightness value, obtaining the mapping data based on the first preset screen brightness value and its corresponding pupil information of the wearer, and each intermediate screen brightness value and its corresponding pupil information of the wearer.

Optionally, the first preset screen brightness value is 0%, and the second preset screen brightness value is 100%.

According to a third aspect of an embodiment of the present disclosure, a head-mounted display device is provided, the head-mounted display device including an ambient brightness detection module and a pupil information detection module, the head-mounted display device further including:

a memory for storing executable computer instructions; and a processor for executing a method according to the first aspect described above for adjusting screen brightness under control of the executable computer instructions.

According to a fourth aspect of an embodiment of the present disclosure, a computer-readable storage medium is provided, on which computer instructions are stored, wherein the computer instructions, when executed by a processor, perform the method according to the first aspect described above.

One beneficial effect of embodiments of the present disclosure is that the head-mounted display device, by acquiring current ambient brightness information and the wearer's current pupil information, determines a target screen brightness value based on the current ambient brightness information and the current pupil information, and then adjusts the screen brightness according to the target screen brightness value. That is, by combination between ambient brightness information and the wearer's pupil information, it can automatically adjust the screen brightness based on the ambient brightness and the wearer's perception, avoiding the inconvenience of manual adjustment and the disadvantages of preset programs that cannot cater to the user's actual perception, thereby improving user experience.

Other features and advantages of this specification will become apparent through the detailed description of the exemplary embodiments of this specification with reference to the accompanying drawings.

BRIEF DESCRIPTION OF THE DRAWINGS

The drawings incorporated in and constituting part of the specification illustrate the embodiments of the present disclosure, and together with the description, serve to explain the principles of the present disclosure.

FIG. 6 is a flow diagram of a method for adjusting screen brightness of a head-mounted display device according to another embodiment of the present disclosure:

DETAILED DESCRIPTION

Various exemplary embodiments of the present disclosure will now be described in detail with reference to the accompanying drawings. It is to be noted that unless otherwise specified, the scope of present disclosure is not limited to relative arrangements, numerical expressions and values of components and steps as illustrated in the embodiments.

Description to at least one exemplary embodiment is for illustrative purpose only, and in no way implies any restriction on the present disclosure or application or use thereof.

Techniques, methods and devices known to those skilled in the prior art may not be discussed in detail: however, such techniques, methods and devices shall be regarded as part of the description where appropriate.

In all the examples illustrated and discussed herein, any specific value shall be interpreted as illustrative rather than restrictive. Different values may be available for alternative examples of the exemplary embodiments.

It is to be noted that similar reference numbers and alphabetical letters represent similar items in the accompanying drawings. In the case that a certain item is identified in a drawing, further elaboration thereof may be omitted in the subsequent drawings.

Hardware Configuration

Figure 1:
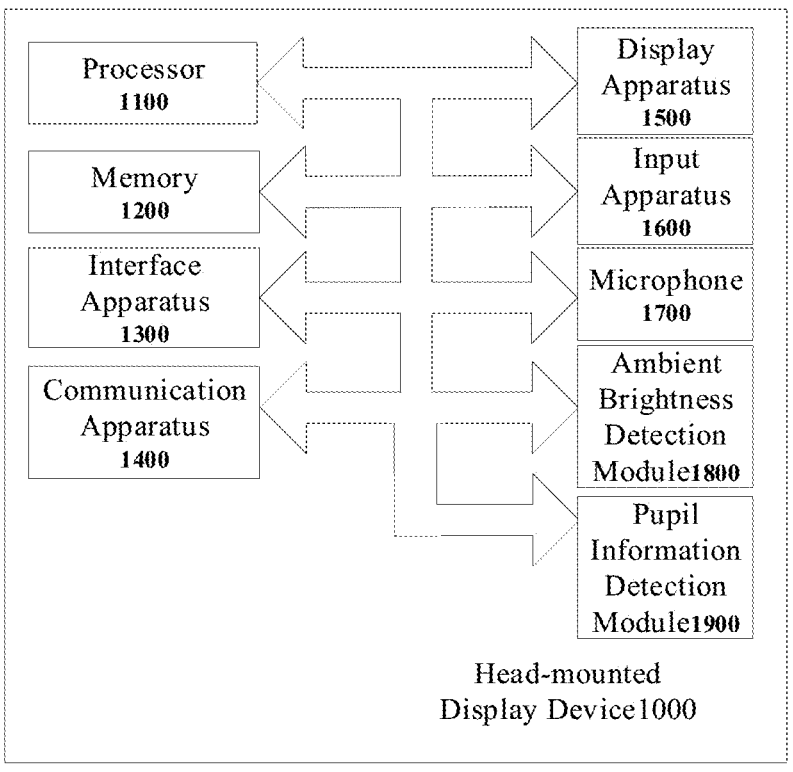
FIG. 1 is a schematic diagram of the hardware configuration of a head-mounted display device according to an embodiment of the present disclosure.

FIG. 1 is a block diagram of the hardware configuration of a head-mounted display system 1000 according to an embodiment of the present disclosure.

As shown in FIG. 1, the head-mounted display device 1000, for example, can be a VR device, an AR (Augmented Reality) device, and an MR (Mixed Reality) device, etc., without limitation in this embodiment.

In one embodiment, as shown in FIG. 1, the head-mounted display device 1000 may include a processor 1100, a memory 1200, an interface apparatus 1300, a communication apparatus 1400, a display apparatus 1500, an input apparatus 1600, a microphone 1700, an ambient brightness detection module 1800, and a pupil information detection module 1900, etc.

Here, the processor 1100 may include but is not limited to a central processing unit (CPU), a microcontroller unit (MCU), etc. The memory 1200 includes, for example, read-only memory (ROM), random access memory (RAM), non-volatile memory such as a hard disk, etc. The interface apparatus 1300 includes, for example, various bus interfaces, such as serial bus interfaces (including USB interfaces), parallel bus interfaces, etc. The communication apparatus 1400, for example, can perform wired or wireless communication. The display apparatus 1500, for example, is a liquid crystal display, an LED display, a touch screen, etc. The input apparatus 1600 includes, for example, a touch screen, a keyboard, a handle, etc. The microphone 1700 can be used to input voice information. The ambient brightness detection module 1800 can be used to detect the brightness of the external environment. The pupil information detection module 1900 can be used to detect the size of the wearer's pupils of the head-mounted display device 1000.

Those skilled in the art should understand that although a plurality of apparatuses of the head-mounted display device 1000 are shown in FIG. 1, the head-mounted display device 1000 in this embodiment of the specification may only involve some of these apparatuses, and may also include other apparatuses, without limitation.

In this embodiment, the memory 1200 of the head-mounted display device 1000 is configured to store instructions that control the processor 1100 to implement or support implementation of the method according to any embodiment for adjusting screen brightness of the head-mounted display device. Those skilled in the art can design instructions according to the technical solution disclosed in this specification. How the instructions control the processor to operate is well known in the art, and is not elaborated in detail here.

Figure 2:
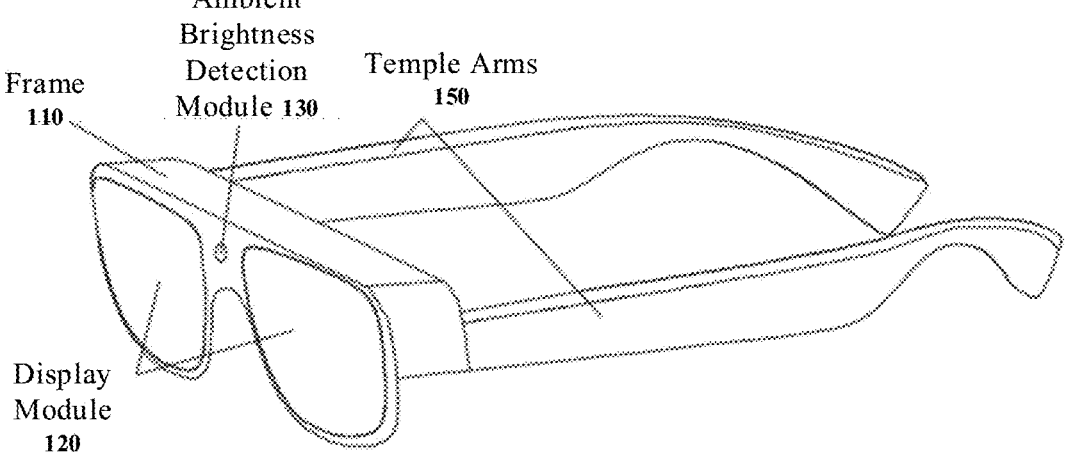
FIG. 2 is a schematic diagram of the hardware structure of a head-mounted display device according to an embodiment of the present disclosure.

In another embodiment, as shown in FIG. 2, the head-mounted display device 1000 also includes a frame 110, a display module 120, an ambient brightness detection module 130 provided on the frame 110, and a pupil information detection module 140 provided on the display module 120, where the ambient brightness detection module 130 is the aforementioned ambient brightness detection module 1800, and the display module 120 is the aforementioned display apparatus 1500, and the pupil information detection module 140 is the pupil information module 1900. As shown in FIG. 2, the head-mounted display device 1000 also includes temple arms 150.

Figure 3:
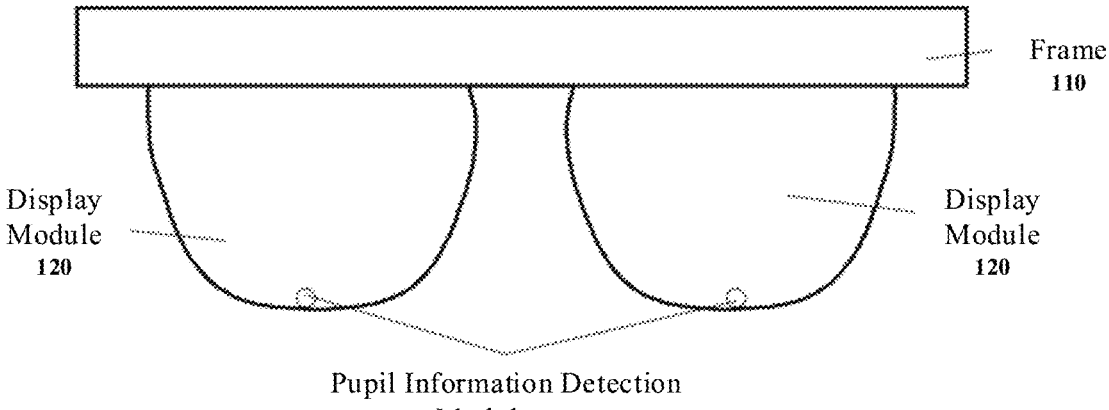
FIG. 3 is a schematic diagram of the hardware structure of a head-mounted display device according to another embodiment of the present disclosure.
Figure 4:
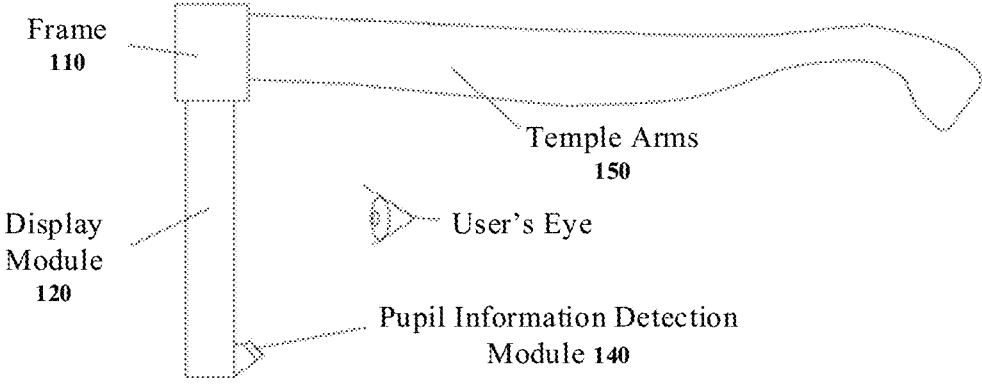
FIG. 4 is a schematic diagram of the hardware structure of a head-mounted display device according to another embodiment of the present disclosure.

In this embodiment, as shown in FIG. 2, the ambient brightness detection module 130 is provided on the outer side of the forehead of the head-mounted display device 1000 and will not be blocked when worn, capable of collecting surrounding ambient brightness information. As shown in FIGS. 2, 3, and 4, the pupil information detection module 140 is located in the middle lower part of the display module 120 and has a certain upward inclination angle to ensure that its detection area can cover the wearer's pupils, ensuring that the user's pupil information can be collected.

In the above description, those skilled in the art can design instructions according to the technical solution provided in the present disclosure. How the instructions control the processor to operate is well known in the art, and is not elaborated in detail here.

The head-mounted display device shown in FIG. 1 is illustrative and is not intended to limit the present disclosure, its applications, or uses.

Method Embodiment

Figure 5:
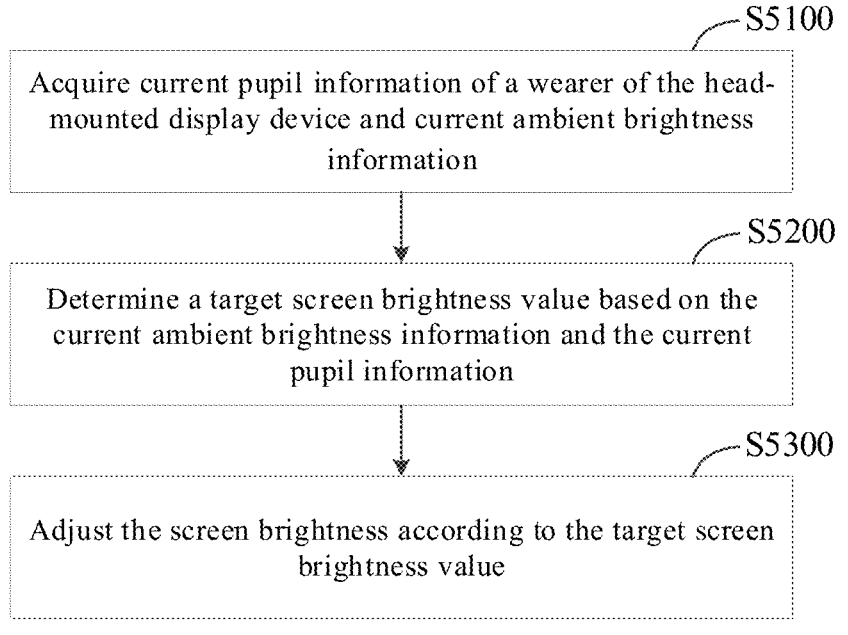
FIG. 5 is a flow diagram of a method for adjusting screen brightness of a head-mounted display device according to an embodiment of the present disclosure.

FIG. 5 illustrates a method for adjusting screen brightness of a head-mounted display device according to an embodiment of the present disclosure, which can be implemented by the head-mounted display device 1000 as shown in FIG. 1.

As shown in FIG. 5, the method for adjusting screen brightness of the head-mounted display device provided in this embodiment can include the following steps S5100~S5300.

Step S5100, acquire current pupil information of a wearer of the head-mounted display device and current ambient brightness information.

In this embodiment, when the wearer is wearing the head-mounted display device, the surrounding ambient brightness information can be collected in real-time through the ambient brightness detection module.

In this embodiment, when the wearer is wearing the head-mounted display device, the pupil size of the wearer can be detected through the pupil information detection module to obtain pupil information.

After acquiring the current ambient brightness information and the current pupil information of the wearer of the head-mounted display device, proceed to:

Step S5200, determine a target screen brightness value based on the current ambient brightness information and the current pupil information.

In this embodiment, after obtaining the current ambient brightness information and the current pupil information of the wearer of the head-mounted display device, the target screen brightness value can be determined based on this current ambient brightness information and this current pupil information, and then the screen brightness can be adjusted based on this target screen brightness value, that is, by using the ambient brightness information and the wearer's pupil information in conjunction to automatically adjust the screen brightness according to the external ambient brightness and the wearer's perception performance.

In this embodiment, step S5200 of determining a target screen brightness value based on the current ambient brightness information and the current pupil information of the wearer of the head-mounted display device can further include the following steps S5210~step S5220:

Step S5210, when the current ambient brightness information meets a preset condition, acquire preset mapping data: where the mapping data reflects a correspondence between the wearer's pupil information and screen brightness values.

The above mapping data specifically reflects a correspondence between the wearer's pupil information and screen brightness values under a preset ambient brightness information. The preset ambient brightness information can be 0. It is understandable that the size of the human pupil changes with the external ambient brightness. The greater the external ambient brightness, the smaller the pupil, and the smaller the external ambient brightness, the larger the pupil. Each person has different pupil sizes under the same light intensity. In order to provide differentiated brightness adjustment for different users and to avoid adjusting the screen brightness solely based on ambient brightness information, there is a learning process before screen brightness adjustment, that is, the step of obtaining the mapping function.

In this embodiment, for example, when the change between the current ambient brightness information and the previous ambient brightness information exceeds a preset threshold range, the step of obtaining the mapping data can be executed: otherwise, the step of obtaining the mapping data is not executed.

In this embodiment, when the wearer first wears the head-mounted display device, the head-mounted display device will obtain the mapping function. The step of obtaining the mapping function can further include: acquiring a first preset screen brightness value and corresponding pupil information of the wearer when the wearer first wears the head-mounted display device: adjusting the first preset screen brightness value based on a preset increment to obtain a plurality of intermediate screen brightness values, acquiring pupil information corresponding to each intermediate screen brightness value; and when the intermediate screen brightness value reaches a second preset screen brightness value, obtaining the mapping data based on the first preset screen brightness value and its corresponding pupil information of the wearer, and each intermediate screen brightness value and its corresponding pupil information of the wearer.

The above first preset screen brightness value is 0%, and the above second preset screen brightness value is 100%.

In this embodiment, when the wearer first wears the head-mounted display device, the head-mounted display device will perform learning to better provide differentiated screen brightness adjustment for different wearers, thereby providing a better user experience. When the wearer first wears the head-mounted display device, the head-mounted display device enters a device learning interface, and a learning process is automatically completed.

Specifically, as shown in FIG. 6, when the wearer first wears the head-mounted display device, the device enters a learning interface, at which point the device enters a learning process, and the device automatically adjusts the screen brightness value to 0%. Concurrently, the pupil information detection module detects the user's pupil information and saves the pupil information corresponding to the current screen brightness value of 0%. It determines whether the screen brightness value has reached 100%. If the screen brightness value has not reached 100%, the screen brightness value automatically increases by a preset increment, for example, 1%, and obtains the corresponding user pupil information. If the screen brightness value reaches 100%, the process ends. In this embodiment, to obtain a more accurate correspondence between pupil information and screen brightness value when the ambient brightness information is 0, the above learning process can be carried out in a dark environment, or the head-mounted display device can be completely covered.

It is understandable that if the above learning process is not carried out in a dark environment or if the head-mounted display device is not completely covered, the ambient brightness information as well as the transparency of the head-mounted display device to the external environment can be detected by the ambient brightness information detection module, and the correspondence between pupil information and screen brightness value when the ambient brightness information is 0 can also be calculated.

Step S5220, determine the target screen brightness value corresponding to the current pupil information based on the aforementioned mapping data.

In this embodiment, after obtaining the mapping data, the target screen brightness value corresponding to the current pupil information can be determined based on that mapping data.

Specifically, if the current pupil information is greater than the maximum pupil information in the mapping data, the minimum screen brightness value in the mapping data can be selected as the target screen brightness value. If the current pupil information is less than the minimum pupil information in the mapping data, the maximum screen brightness value in the mapping data can be selected as the target screen brightness value. If the current pupil information is between the maximum and minimum pupil information in the mapping data, the screen brightness value corresponding to the current pupil information in the mapping data can be directly obtained as the target screen brightness value.

After determining the target screen brightness value based on the current ambient brightness information and the pupil information of the head-mounted display device, proceed to:

Step S5300, adjust the screen brightness according to the target screen brightness value.

In this embodiment, after determining the target screen brightness value according to the above steps, the screen brightness can be automatically adjusted based on this target screen brightness value to achieve automatic adjustment of screen brightness according to external ambient brightness and the wearer's perception performance.

According to the embodiment of the present disclosure, the head-mounted display device collects current ambient brightness information and the wearer's current pupil information, and determines the target screen brightness value based on the current ambient brightness information and current pupil information, and then adjusts the screen brightness according to the target screen brightness value. That is, it can use the ambient brightness information and the wearer's pupil information in conjunction to automatically adjust the screen brightness according to the external ambient brightness and the wearer's perception performance, avoiding the inconvenience brought about by manual adjustment and the shortcomings of preset program adjustments that cannot take into account the user's actual perception, thereby improving user experience.

Figure 7:
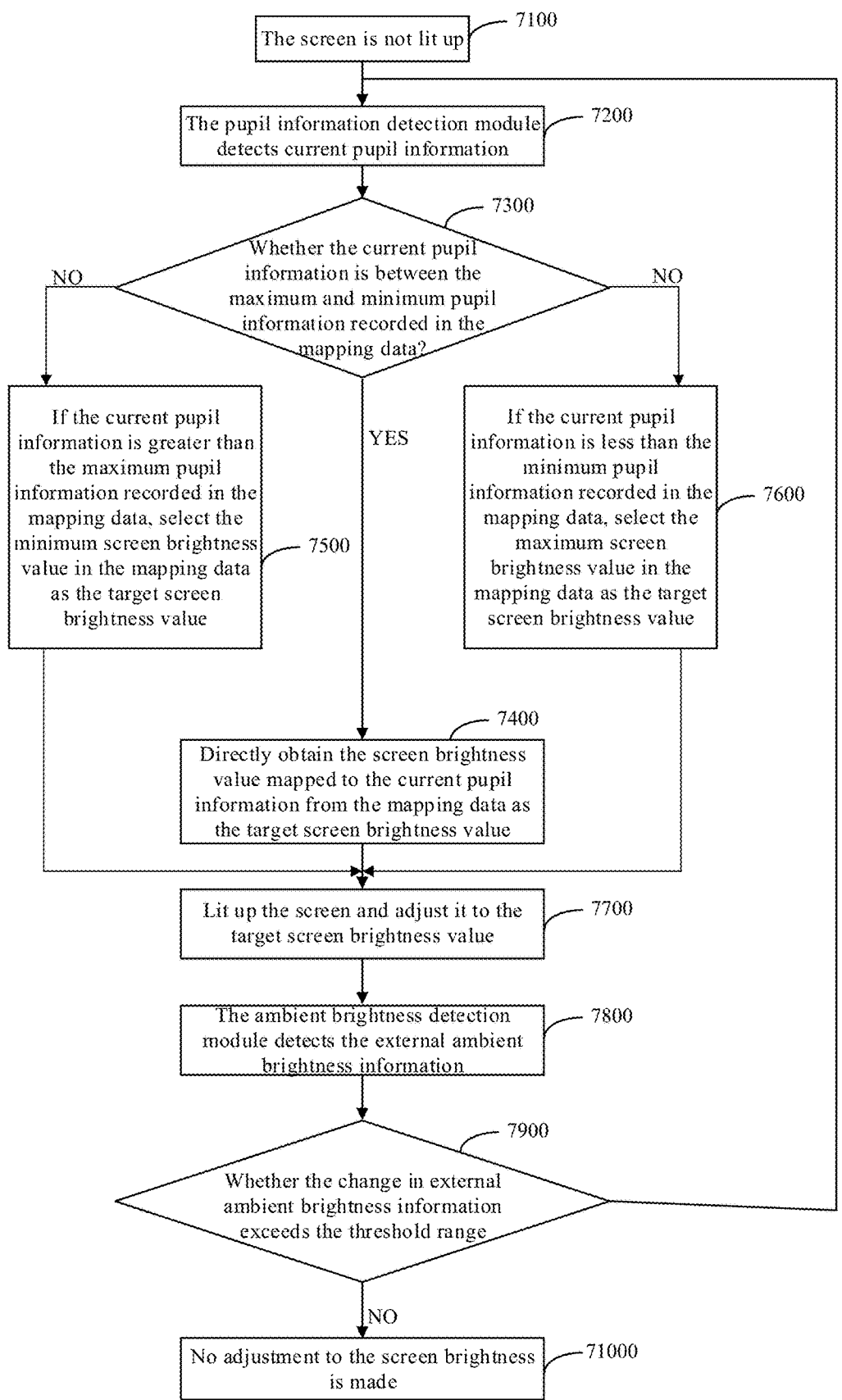
FIG. 7 is a flow diagram of a method for adjusting screen brightness of a head-mounted display device according to another embodiment of the present disclosure.

Next, an example of the screen brightness adjustment method of a head-mounted display device is demonstrated, which, as shown in FIGS. 6 and 7, can further include the following:

(1) When the wearer first uses the head-mounted display device, a learning process is required to better provide differentiated screen brightness adjustment for different wearers. When the wearer first uses the head-mounted display device, they first enter the device learning interface to trigger the device learning process, specifically including the following steps S6100 to step S6700:

Step S6100, when the wearer first wears the head-mounted display device, the device enters the learning interface, at which point the device enters the learning process.

Step S6200, the device automatically adjusts the screen brightness value to 0%.

Step S6300, the pupil information detection module detects the pupil information corresponding to the current screen brightness value.

Step S6400, determine whether the screen brightness value has reached 100%: if the screen brightness value has not reached 100%, proceed with step S6500: otherwise, proceed with step S6600.

Step S6500, if the screen brightness value has not reached 100%, the screen brightness value automatically increases by a preset increment, for example, 1%, and then proceed with step S6300.

Step S6600, based on the ambient brightness information detected by the ambient brightness detection module and the transparency of the head-mounted display device to the external environment, calculate the correspondence between pupil information and screen brightness value when the ambient brightness information is 0.

Step S6700, save the correspondence between pupil information and screen brightness value when the ambient brightness information is 0 as mapping data, and end the learning process.

It is understandable that, in order to obtain a more accurate correspondence between pupil information and screen brightness value when the ambient brightness information is 0, the above learning process can be carried out in a dark environment, or the head-mounted display device can be completely covered.

(2) After the head-mounted display device has completed learning, it can enter the automatic screen brightness adjustment process, which includes the following steps:

Step S7100, the head-mounted display device enters a screen-off state, that is, the screen is not lit up.

Step S7200, the pupil information detection module detects the wearer's current pupil information.

Step S7300, determine whether the current pupil information is between the maximum and minimum pupil information recorded in the mapping data. If it is between, proceed with step S7400. If the current pupil information is greater than the maximum pupil information recorded in the mapping data, proceed with step S7500. If the current pupil information is less than the minimum pupil information recorded in the mapping data, proceed with step S7600.

Step S7400, if the current pupil information is between the maximum and minimum pupil information in the mapping data, directly obtain the screen brightness value corresponding to the current pupil information from the mapping data as the target screen brightness value, and then proceed with step S7700.

Step S7500, if the current pupil information is greater than the maximum pupil information recorded in the mapping data, select the minimum screen brightness value in the mapping data as the target screen brightness value, and then proceed with step S7700.

Step S7600, if the current pupil information is less than the minimum pupil information recorded in the mapping data, select the maximum screen brightness value in the mapping data as the target screen brightness value, and then proceed with step S7700.

Step S7700, adjust the screen brightness based on the target brightness value, that is, lit up the screen and adjust it to the target screen brightness value.

Step S7800, the ambient brightness detection module detects the external ambient brightness information.

Step S7900, determine whether the change in external ambient brightness information exceeds the threshold range. If it does, proceed with Step S7200: otherwise, proceed with Step S71000.

Step S71000, if the change in external ambient information does not exceed the threshold range, then no adjustment to the screen brightness is made.

Device Example

Figure 8:
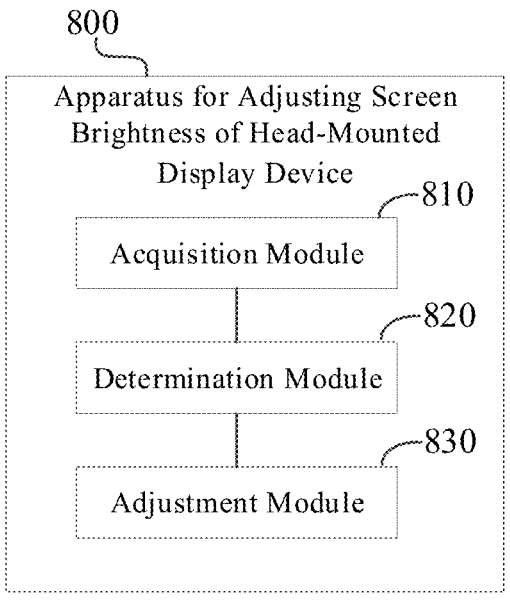
FIG. 8 is a principal block diagram of an apparatus for adjusting screen brightness of a head-mounted display device according to an embodiment of the present disclosure.

This embodiment of the disclosure provides a device for adjusting screen brightness of a head-mounted display device, as shown in FIG. 8. The screen brightness adjustment device 800 for the head-mounted display device can include an acquisition module 810, a determination module 820, and an adjustment module 830.

Acquisition module 810 is configured to acquire current pupil information of a wearer of the head-mounted display device and current ambient brightness information.

Determination module 820 is configured to determine a target screen brightness value based on the current ambient brightness information and the current pupil information.

Adjustment module 830 adjusts the screen brightness according to the target screen brightness value.

In one embodiment, the determination module 820 is specifically configured to: acquire preset mapping data when the current ambient brightness information meets a preset conditions: where the mapping data reflects a correspondence between the wearer's pupil information and screen brightness values; and determine a target screen brightness value corresponding to the current pupil information based on the mapping data.

In one embodiment, before the acquisition module acquires current pupil information of a wearer of the head-mounted display device and current ambient brightness information, the acquisition module 810 is also configured to obtain the mapping data. The acquisition module 810, for obtaining the mapping data, includes: when the wearer first wears the head-mounted display device, acquiring a first preset screen brightness value and the corresponding pupil information of the wearer: adjusting a first preset screen brightness value by a preset increment to obtain a plurality of intermediate screen brightness values, and acquiring pupil information corresponding to each intermediate screen brightness value; and when the intermediate screen brightness value reaches a second preset screen brightness value, obtaining the mapping data based on the first preset screen brightness value and its corresponding pupil information of the wearer, and each intermediate screen brightness value and its corresponding pupil information of the wearer.

In one embodiment, the first preset screen brightness value is 0%, and the second preset screen brightness value is 100%.

According to this embodiment of the disclosure, the head-mounted display device collects current ambient brightness information and the wearer's current pupil information, and determines the target screen brightness value based on the current ambient brightness information and current pupil information, and then adjusts the screen brightness according to the target screen brightness value. That is, it can use the ambient brightness information and the wearer's pupil information in conjunction to automatically adjust the screen brightness according to the external ambient brightness and the wearer's perception performance, avoiding the inconvenience brought about by manual adjustment and the shortcomings of preset program adjustments that cannot take into account the user's actual perception, thereby improving user experience.

Device Example

Figure 9:
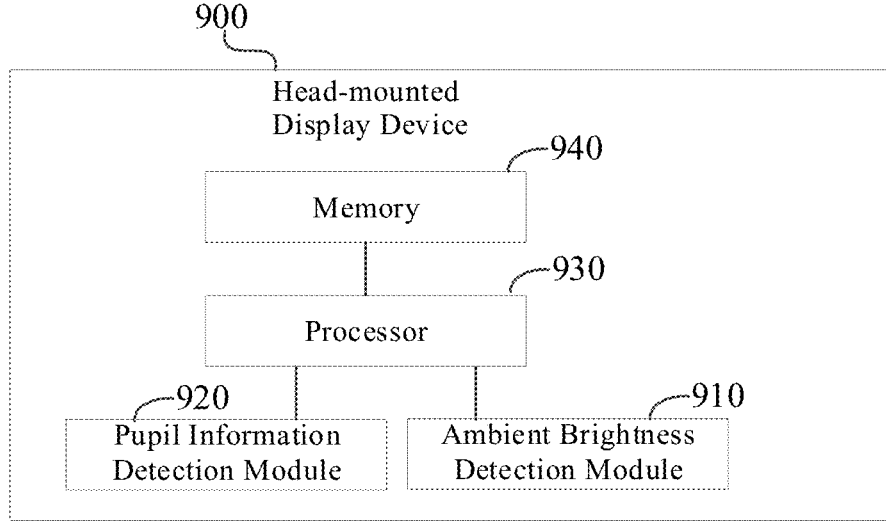
FIG. 9 is a principal block diagram of a head-mounted display device according to an embodiment of the present disclosure.

FIG. 9 is a schematic diagram of the hardware structure of a head-mounted display device according to one embodiment. As shown in FIG. 9, the head-mounted display device 900 includes an ambient brightness detection module 910 and a pupil information detection module 920. The head-mounted display device 900 also includes a processor 930 and a memory 940.

The memory 940 can be used to store executable computer instructions.

The processor 930 can be used to execute the method for adjusting screen brightness of a head-mounted display device under control of the executable computer instructions as described in this embodiment of the method.

The head-mounted display device 900 can be the head-mounted display device 1000 shown in FIG. 1, or it can be a device with other hardware structures, which is not limited here. The head-mounted display device 900, for example, can be a VR device, an AR device, and an MR device, etc., and this embodiment of the disclosure is not limited to this.

In another embodiment, the head-mounted display device 900 can include the above screen brightness adjustment device 800 for the head-mounted display device.

In one embodiment, the modules of the above screen brightness adjustment device 800 for the head-mounted display device can be implemented by running the computer instructions stored in the memory 940 with the processor 930.

According to this embodiment of the disclosure, the head-mounted display device collects current ambient brightness information and the wearer's current pupil information, and determines the target screen brightness value based on the current ambient brightness information and current pupil information, and then adjusts the screen brightness according to the target screen brightness value. That is, it can use the ambient brightness information and the wearer's pupil information in conjunction to automatically adjust the screen brightness according to the external ambient brightness and the wearer's perception performance, avoiding the inconvenience brought about by manual adjustment and the shortcomings of preset program adjustments that cannot take into account the user's actual perception, thereby improving user experience.

Computer-Readable Storage Medium

This embodiment of the disclosure also provides a computer-readable storage medium on which computer instructions are stored. These computer instructions, when executed by a processor, perform the method for adjusting screen brightness of a head-mounted display device provided by this embodiment of the disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present disclosure is defined by the attached claims.

The invention claimed is:

1. A method for adjusting a screen brightness of a head-mounted display device configured to be worn by a current wearer, comprising:

performing a learning process before adjusting the screen brightness to obtain mapping data, the learning process comprising:

acquiring a first preset screen brightness value and a corresponding pupil size of a current wearer when the current wearer first wears the head-mounted display device, adjusting the first preset screen brightness value based on a preset increment of the screen brightness increased automatically to obtain a plurality of intermediate screen brightness values, and acquiring a pupil size of the current wearer corresponding to each intermediate screen brightness value; and when the intermediate screen brightness values reach a second preset screen brightness value, obtaining the mapping data based on the first preset screen brightness value and its corresponding pupil size of the current wearer, and each intermediate screen brightness value and its corresponding pupil size of the current wearer, saving the mapping data, and ending the learning process, wherein the mapping data reflects a correspondence between the pupil size of the current wearer and screen brightness values and provides differentiated brightness adjustment for the current wearer and to avoid adjusting the screen brightness solely based on ambient brightness information; and performing a screen brightness adjustment process after the head-mounted display device has completed the learning process, the screen brightness adjustment process comprising, acquiring a current pupil size of the current wearer and current ambient brightness information;

determining a target screen brightness value based on the current ambient brightness information and the current pupil size by combining the mapping data; and adjusting the screen brightness according to the target screen brightness value, wherein the performing the screen brightness adjustment process further comprises:

determining whether change in the current ambient brightness information exceeds a threshold range, wherein if the change does not exceed the threshold range, no adjustment to the screen brightness is made; and wherein if the change exceeds the threshold range, the screen brightness is adjusted, and determining whether the current pupil size is between a maximum pupil size and a minimum pupil size recorded in the mapping data; wherein if the current pupil size is between the maximum pupil size and the minimum pupil size, a screen brightness value corresponding to the current pupil size from the mapping data is obtained as the target screen brightness value; wherein if the current pupil size is greater than the maximum pupil size recorded in the mapping data, a minimum screen brightness value in the mapping data is selected as the target screen brightness value, and wherein if the current pupil size is less than the minimum pupil size recorded in the mapping data, a maximum screen brightness value in the mapping data is selected as the target screen brightness value.

2. The method of claim 1, wherein the determining a target screen brightness value based on the current ambient brightness information and the current pupil size comprises:

acquiring preset mapping data when a change between the current ambient brightness information and previous ambient brightness information exceeds a preset threshold range; and determining a target screen brightness value corresponding to the current pupil size based on the mapping data.

3. An apparatus for adjusting screen brightness of a head-mounted display device configured to be worn by a current wearer, the apparatus comprising:

an ambient brightness detection module for acquiring current ambient brightness information;

a pupil size detection module for acquiring a current pupil size of a current wearer; and a processor for determining a target screen brightness value based on the current ambient brightness information and the current pupil size by combining mapping data and for adjusting the screen brightness according to the target screen brightness value, wherein the ambient brightness detection module and the pupil size detection module are further configured to obtain the mapping data by performing a learning process before adjusting the screen brightness to obtain the mapping data by, acquiring a first preset screen brightness value and a corresponding pupil size of the current wearer when the current wearer first wears the head-mounted display device;

adjusting the first preset screen brightness value based on a preset increment of the screen brightness increased automatically to obtain a plurality of intermediate screen brightness values, and acquiring a pupil size of the current wearer corresponding to each intermediate screen brightness value; and when the intermediate screen brightness values reach a second preset screen brightness value, obtaining the mapping data based on the first preset screen brightness value and its corresponding pupil size of the wearer, and each intermediate screen brightness value and its corresponding pupil size of the current wearer, saving the mapping data, and ending the learning process, wherein the mapping data reflects a correspondence between the pupil size of the current wearer and screen brightness values and provides differentiated brightness adjustment for the current wearer and to avoid adjusting the screen brightness solely based on ambient brightness information, and wherein after the learning process the processor is further configured to:

determine whether change in the current ambient brightness information exceeds a threshold range, if the change does not exceed the threshold range, no adjustment to the screen brightness is made; if the change exceeds the threshold range, the screen brightness is adjusted, and determine whether the current pupil size is between a maximum pupil size and a minimum pupil size recorded in mapping data, if the current pupil size is between the maximum pupil size and the minimum pupil size, a screen brightness value corresponding to the current pupil size from the mapping data is obtained as the target screen brightness value; if the current pupil size is greater than the maximum pupil size recorded in the mapping data, a minimum screen brightness value in the mapping data is selected as the target screen brightness value, and if the current pupil size is less than the minimum pupil size recorded in the mapping data, a maximum screen brightness value in the mapping data is selected as the target screen brightness value.

4. The apparatus of claim 3, wherein the processor is configured to:

acquire preset mapping data when a change between the current ambient brightness information and previous ambient brightness information exceeds a preset threshold range; and determine a target screen brightness value corresponding to the current pupil size based on the mapping data.

5. A head-mounted display device comprising an ambient brightness detection module and a pupil size detection module, comprising:

a memory for storing executable computer instructions; and a processor for executing a method of claim 1 for adjusting screen brightness under control of the executable computer instructions.

6. A non-transitory computer-readable storage medium, on which computer instructions are stored, wherein the computer instructions, when executed by a processor, perform the method of claim 1 for adjusting screen brightness.

7. The method of claim 1, wherein performing the learning process further comprises:

the learning process is carried out in a dark environment, or the head-mounted display device is completely covered.

8. The method of claim 1, wherein performing the learning process further comprises:

if the learning process is not carried out in a dark environment or if the head-mounted display device is not completely covered, the ambient brightness information as well as transparency of the head-mounted display device to an external environment is detected, and a correspondence between the pupil size and the screen brightness value when the ambient brightness information is 0 is calculated.

9. The apparatus of claim 3, wherein the ambient brightness detection module and the pupil size detection module are further configured to carry out the learning process in a dark environment, or by completely covering the head-mounted display device.

10. The apparatus of claim 3, wherein the processor is configured to:

if the learning process is not carried out in a dark environment or if the head-mounted display device is not completely covered, the ambient brightness information as well as transparency of the head-mounted display device to external environment is detected by the ambient brightness information detection module, and the correspondence between pupil size and screen brightness value when the ambient brightness information is 0 is calculated.

* * * * *